//

3,212,966
2,4,5-TRIPHENYL- AND 2-NAPHTHYL
IMIDAZOLE AS NEMATOCIDES
Jack H. Krause, Media, Pa., assignor to Air Products and Chemicals, Inc., Philadelphia, Pa., a corporation of Delaware
No Drawing. Filed Mar. 7, 1963, Ser. No. 263,438
4 Claims. (Cl. 167—33)

The present invention relates to organic pesticides having selective action on nematodes of the various types deleterious to plant life.

I have found that certain aryl substituted imidazole compounds, particularly those containing an aryl substituent in the 2-position and at least one aryl group attached to a nuclear carbon of the imidazole ring, have selective activity as nematocides. The preferred compounds are those of the formula

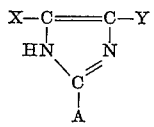

in which A is phenyl or naphthyl and at least one of the substituents X and Y is phenyl or naphthyl; or one of these may be hydrogen. Among the compounds coming within the above formula, special mention is made of 2,4,5-triphenylimidazole and 2-naphthyl-4,5-diphenyl imidazole. Each of these compounds, when subjected to standard testing procedure showed high activity as nematocides, with comparatively little or no damage to plant life. Moreover, these compounds have low toxicity against most insects and warm blooded animals.

Example 1

The tests were carried out in standard manner, as follows: 100 grams of moist clean sand is blended with 5 grams of a brei prepared from heavily infested roots of tomato plants inoculated two months previously with *Meloidogyne incognita adrita*. 100 milligrams of the test chemical is blended with the sand/brei mixture and stored for 24 hours in small receptacles, then transferred to dishes having 100 mesh screen bottoms. These dishes are placed in Petri dishes containing water for two hours. A distributional count is then made of the living and dead nematodes in the water of the Petri dish. Percent control is calculated from these data. Tests are run in duplicates with check and standards included, taking into consideration natural mortality of the nematodes.

Applying the above test to 2 naphthyl-4,5-diphenylimidazole, in a concentration of 0.05%, complete kill was obtained (100%).

The solution of the imidazole compound was prepared by dissolving in innocuous water miscible organic solvent (alcohol or acetone may be used) in the proportion of 1 gm. per 5 ml., to which is added 0.1 gm. of surfactant and the solution made up to 100 ml. in distilled water to provide the stock solution, which is then further diluted with distilled water to desired concentration.

The above named naphthyl diphenyl imidazole was also subjected to standard tests for herbicidal, fungicidal and insecticidal activity. It showed quite low activity in inhibition of seed germination, and also in post-emergence application for foliar phytotoxicity in 0.1% concentration. Likewise, systemic injury to wheat, soya bean, tomato, broad grass and lawn grass was practically absent. These tests are applied at a dosage equivalent to 100 pounds per acre in approximately 500 gallons of water.

Insecticidal tests made on army worm, fly bait, bean beetle, bean aphid and spider mite in standard test concentrations, evidenced little or no activity.

Example 2

The above described tests were applied to 2,4,5-triphenyl imidazole, obtaining 100% kill in nematodes at 0.05% concentration.

The selective nematocidal activity of these di- and tri-aryl imidazole compounds appears to be quite unique. Corresponding tri-alkyl compounds containing up to 12 carbon atoms in one or more of the alkyl substituents, generally showed only fair to poor nematocidal activity with rather high foliar phytotoxicity.

The nematocides of the invention may be applied in the usual manner current for standard plant-parasitic nematodes; for example, by pretreatment of the soil with aqueous solutions or dispersions by handgun or machine applicators, and because of low phytotoxicity application to the roots of established plants may be safely adopted. In certain types of plants, spray application may be used for leaf and bud nematodes; test for injury to the particular plant should, however, be first determined. In general, aqueous solutions or dispersions of from about 0.01 to 1% concentration may be used; higher concentrations may be prepared for subsequent dilution at the site of application.

The described aryl imidazole compounds may be prepared by the known condensation of appropriate aryl substituted α-diketones and aldehydes with ammonia. For example, 2-aryl derivatives of 4,5-diphenyl imidazole may be prepared by reacting an aromatic aldehyde with ammonia and benzil (dibenzoyl) in the presence of ammonium acetate in acetic acid. The preparation of 2,4,5-triphenyl imidazole is described by Hoffman (Imidazole and Derivatives, Part I, 1953, at pages 45–47). 2,4-diphenyl imidazole can be prepared by condensing benzamidine with brominated acetophenone (Kunckell: Berichte Deutsche Chemische Ges. 34, 637 (1901)); the corresponding naphthyl derivatives are similarly prepared from the appropriate starting materials.

Any of the known commercial anionic surfactants may be employed in making up the nematocide composition, including alkali metal salts of sulfated higher alcohols, and of alkylated benzene and naphthalene sulfonic acids, particularly sodium salts of lauryl sulfate, of isopropyl naphthalene sulfonate, or of dodecyl benzene sulfonate.

Obviously, many modifications and variations of the invention as hereinbefore set forth may be made without departing from the spirit and scope thereof and therefore only such limitations should be imposed as are indicated in the appended claims.

I claim:

1. The method of treating nematode-infested plants which comprises applying to the soil in which these plants are propagated an aqueous composition containing as its essential active ingredient in effective concentration a compound of the formula

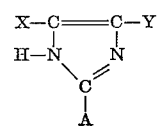

wherein A is selected from the group consisting of phenyl and naphthyl and either of the substituents X and Y is selected from the group consisting of hydrogen, phenyl and naphthyl, the other of these substituents being selected from the group consisting of phenyl and naphthyl.

2. The method according to claim 1 in which said compound is 2,4,5-triphenyl imidazole.

3. The method according to claim 1 in which said compound is 2-naphthyl-4,5-diphenyl imidazole.

4. The method of treating nematode-infested plants which comprises applying to the soil in which these plants are propagated a compound of the formula

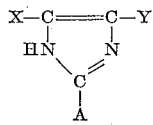

wherein A is selected from the group consisting of phenyl and naphthyl and either of the substituents X and Y is selected from the group consisting of hydrogen, phenyl and naphthyl, the other of these substituents being selected from the group consisting of phenyl and naphthyl.

References Cited by the Examiner

UNITED STATES PATENTS

| | | | |
|---|---|---|---|
| 2,801,243 | 7/57 | Hanslick et al. | 260—309 |
| 2,953,492 | 9/60 | Duggins | 167—33 |
| 2,955,976 | 10/60 | Godfrey | 167—22 |
| 3,102,071 | 8/63 | Hodge | 167—33 |

OTHER REFERENCES

Chemical Abstracts, vol. 58 (1963), p. 2462f. Abstract of U.S. 3,030,224, April 1962.

Chemical Abstracts, vol. 58, pages 2530–2531 (1963). Abstract of Belgium Patent No. 585,555, April 1, 1960.

Gompper, Berichte Deutsche Chemische Ges. 89, pp. 1762–8 (1956).

Hoffman, "Imidazole and Derivatives," Part I, 1953, pages 45–47.

JULIAN S. LEVITT, *Primary Examiner*.